UNITED STATES PATENT OFFICE.

HENRY D. BOSTOCK, OF JACKSONVILLE, FLORIDA.

PROCESS FOR PRESERVING EGGS.

1,194,128. Specification of Letters Patent. Patented Aug. 8, 1916.

No Drawing. Application filed December 27, 1915. Serial No. 68,848.

*To all whom it may concern:*

Be it known that I, HENRY D. BOSTOCK, a citizen of the United States, residing at Jacksonville, in the county of Duval and State of Florida, have invented certain new and useful Improvements in Processes for Preserving Eggs; and I do hereby declare the following to be a full, clear, and exact description of the invention, such as will enable others skilled in the art to which it appertains to make and use the same.

This invention relates to new and useful improvements in processes for preserving eggs.

I have discovered that a plant commonly known as beggarweed, the scientific name of which is *Desmodium tortuosum (neibomia)*, possesses egg preserving qualities and, in the carrying out of my process, I employ stems and leaves of this plant, the same being first previously dried and the eggs are securely packed within a suitable receptacle, a sufficient quantity of the plant being employed to serve as adequate protection for changes in temperature.

What I claim to be new and desire to secure by Letters Patent is:—

The herein described process for preserving eggs, the same consisting in providing the eggs with a packing of the leaves and stems of *Desmodium tortuosum (neibomia)*.

In testimony whereof I hereunto affix my signature in presence of two witnesses.

HENRY D. BOSTOCK.

Witnesses:
O. B. STEPHENS,
JOHN T. STEPHENS.